April 6, 1965 R. LA ROSA 3,177,436

TRANSFORMING PUMP SIGNAL CIRCUIT FOR TRAVELING WAVE PARAMETRIC AMPLIFIERS

Filed April 3, 1962

3,177,436

TRANSFORMING PUMP SIGNAL CIRCUIT FOR TRAVELING WAVE PARAMETRIC AMPLIFIERS

Richard La Rosa, South Hempstead, N.Y., assignor to Hazeltine Research Inc., a corporation of Illinois Filed Apr. 3, 1962, Ser. No. 184,694
4 Claims. (Cl. 330—4.6)

This invention relates to a pump signal circuit and more particularly to a circuit for efficiently coupling pump signals to parametric amplification elements in a traveling-wave parametric amplifier.

In a traveling-wave parametric amplifier using amplification devices in the form of variable capacitance diodes, for example, the function of the pump signals is to swing the capacitance of the diodes over a fairly wide range. A given voltage is required to do this, but the actual power required is a relatively small amount necessary to supply diode and line losses.

However, certain design requirements have caused prior art traveling-wave parametric amplifiers to require a large amount of pump signal power. One such requirement is that of supplying each successive diode with pump signals of substantially equal potential. This restricts allowable loading-down of the pump line. The pump signal path is also required to have essentially no standing waves and therefore no reflecting terminations or mismatches. Prior art systems have met these requirements through use of a low impedance pump signal propagation path resistively terminated thereby wasting a large portion of the pump power in the load. In this way, a substantially equal pump signal potential is supplied to each diode because the power extracted from the pump line by each diode is only a small fraction of the total power and therefore only a small percentage decrease results at each diode. Under such a system, the pump power required is inversely proportional to the impedance of the pump signal propagation path and prior systems have resistively dissipated on the order of 80% of the input pump power.

It is an object of this invention, therefore to provide improved pump signal circuits which avoid one or more of the disadvantages of prior art arrangements.

It is a further object of this invention to provide a pump signal circuit for a traveling-wave parametric amplifier which allows efficient use of pump signals.

In accordance with the invention a pump signal circuit for a traveling-wave parametric amplifier comprises a plurality of parametric amplification elements, a reference potential conductor, a pump signal propagation path and a plurality of pump signal transformation means coupling the amplification elements to the pump path and also to the reference conductor for providing paths of similar electrical length between each of the amplification elements and the reference conductor, while also providing paths between the amplification elements and the pump path whose electrical lengths are independently chosen for different amplification elements so that pump signals are coupled to the amplification elements with transformation to the proper potential for each amplification element.

For a better understanding of the present invention, together with other and further objects thereof, reference is had to the following description taken in connection with the accompanying drawing, and its scope will be pointed out in the appended claims.

Figure 1:
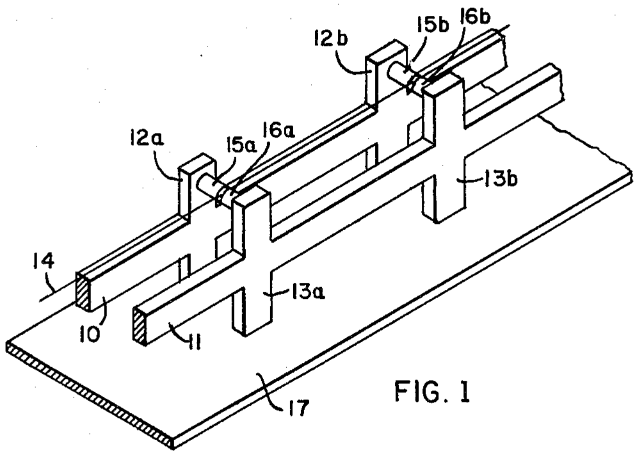
FIG. 1 is an isometric view of a portion of a pump signal circuit in accordance with the invention.

Referring to FIG. 1 of the drawing there is shown a portion of a traveling-wave parametric amplifier including a pump signal circuit embodying the invention. This circuit comprises a pump signal propagation path shown as relatively heavy, rectangular, metallic bars 10 and 11 and a plurality of pump signal transformation means shown as vertical, rectangular, metallic bars 12*a*, 13*a*, 12*b* and 13*b*, which are coupled to the propagation path conductors 10 and 11. The parametric amplifier also includes a signal and idler propagation path shown as thin wire 14 and variable capacitance diodes 15*a*, 16*a*, 15*b* and 16*b*, which are coupled between the path 14 and the transformation means 12 and 13. The lower ends of the transformation means 12 and 13 connect to a metallic ground plate 17 either directly or through a capacitance arrangement allowing D.-C. bias to be applied to the diodes through the pump signal path. In the particular embodiment shown it will be assumed that means 12 and 13 connect directly to the ground plate 17. Operation of this arrangement may be more easily described with reference to the low-frequency equivalent circuit of FIG. 2 wherein like elements are indicated by the same reference characters.

Figure 2:
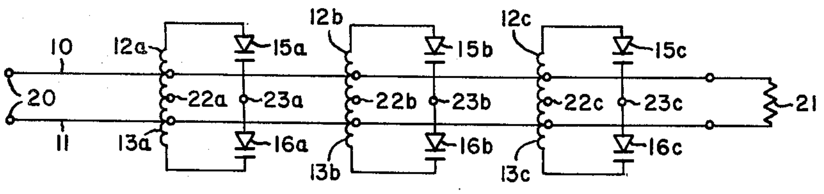
FIG. 2 is a schematic diagram of a low-frequency circuit equivalent to the FIG. 1 circuit.

In FIG. 2 there are additionally shown a source of pump signals, illustrated as input terminals 20, and means for terminating the pump signal path, shown as resistor 21. In FIG. 2 the ground plate 17 is not shown but it will be understood that it actually connects together points 22*a*, 22*b* and 22*c*, which are shown as the connection between the individual transformation means 12*a* and 13*a*, for example. Also not shown is the input and idler signal path 14 which, it will be understood, connects between the points 23*a*, 23*b* and 23*c*. In operation, the transformation means 12 and 13, which are actually transmission line sections, act like a common auto-transformer to transform the potential of the pump signals appearing on the pump signal path conductors 10 and 11 to the proper higher potentials required for control of the variable capacitance diodes 15 and 16. In this way if the transformer ratio is "$n$," the pump signal voltage at the termination 21 is $1/n$ times the voltage which would have been dissipated in the termination if the diodes had been connected directly across the pump line, as in the prior art. Thus, a substantial power saving is made possible.

If the transformation ratio is too great, the losses of the diodes will load down the pump signal path and cause a decay in the potential of the pump signals along the propagation path. Such loading is compensated for in the FIG. 3 arrangement.

Figure 3:
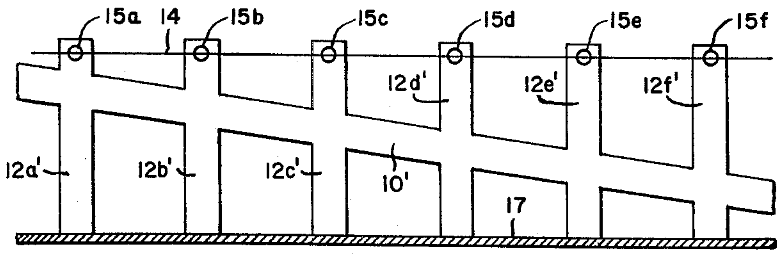
FIG. 3 is a side, sectional view of another form of pump signal circuit in accordance with the invention.

FIG. 3 is a side view of a pump signal path conductor 10' with connected transformation means 12*a'*–12*f'*, inclusive. This arrangement is similar to the arrangement of FIG. 1 except that the pump signal path conductor 10 will be seen to be slanted down toward the ground plate at the termination end. In the FIG. 3 arrangement, the loading of the pump signal path can be compensated for by the raising of the characteristic impedance of the pump line at each successive diode connection point. Thus the voltage applied to each successive pair of diodes can be made the same even though the actual pump signal voltage falls in magnitude along the pump signal path. This is accomplished by varying the transformation ratio from one transformation means to the next along the pump signal path as shown. In this way, each successive transformation means 12 provides the function of a transformer as shown in FIG. 2, but a different transformation ratio is provided so as to compensate for the decrease in pump signal potential amplitude along the conductor 10'.

While the FIG. 1 circuit will allow substantial savings of pump signal power as compared to the prior art, the FIG. 3 arrangement makes possible even greater power savings. In FIG. 3, only a small portion of the input pump signal power remains to be resistively dissipated subsequent to the last variable capacitance diode 15*f*.

The pump signal transformation means may be required to provide functions in addition to just handling the pump signals. In the illustrated examples, the conductors 10 and 11 are required to act as ground returns for idler and input signals appearing on the conductor 14. The carrying out of these additional functions is facilitated in the illustrated circuits by having each of the means 12 and 13 of equal length between amplification elements 15 and reference conductor 17.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pump signal circuit for a traveling-wave parametric amplifier comprising:

a plurality of parametric amplification elements;

a reference potential conductor;

a pump signal propagation path;

and a plurality of pump signal transformation means, coupling said amplification elements to said pump path and also to said reference conductor, for providing paths of similar electrical length between each of the amplification elements and the reference conductor, while also providing paths between the amplification elements and the pump path whose electrical lengths are independently chosen for different amplification elements so that pump signals are coupled to the amplification elements with transformation to the proper potential for each amplification element.

2. A pump signal circuit for a traveling-wave parametric amplifier comprising:

a plurality of parametric amplification elements;

a reference potential conductor;

a pump signal propagation path;

and a plurality of pump signal transformation means, connected along said pump path and coupling said amplification elements to said pump path and also to said reference conductor, for providing electrical paths of substantially equal length between each of the amplification elements and the reference conductor, while also providing paths between the amplification elements and the pump path which are longer for transformation means connected at successive points along the pump path so that pump signals are coupled to the amplification means with successively greater transformation ratios to compensate for loading of the pump path so that pump signals of substantially identical potential level are applied to all amplification elements.

3. A pump signal circuit for a traveling-wave parametric amplifier comprising:

a plurality of parametric amplification elements, each having two terminals, arranged in pairs with a common connection between the amplification elements of each pair;

a reference potential conductor;

a source of pump signals having two pump signal supply terminals;

a pump signal propagation path in the form of two independent conductors, one connected to each of said pump signal supply terminals;

a plurality of pairs of pump signal transformation means, each said pair comprising a pair of transformation conductors connected at one end to the free terminals of a pair of said amplification elements, connected at an intermediate point to said pump conductors and coupled at the remaining end to said reference conductor, all of said transformation conductors having substantially the same over-all electrical length between the amplification elements and the reference conductor but each succeeding pair of transformation conductors providing a path between the amplification elements and the pump conductors of independently chosen electrical length which may differ for each pair of amplification elements;

and means coupled to said pump signal propagation conductors for terminating said conductors;

said pump signal circuit being so constructed and arranged that in operation pump signals existing on said pump conductors are transformed to desired potential levels and supplied to said amplification elements, with each successive pair of transformation means providing the desired transformation ratio for the associated pair of amplification elements.

4. A pump signal circuit for a traveling-wave parametric amplifier comprising:

a plurality of parametric amplification elements, each having two terminals arranged in pairs with a common connection between the amplification elements of each pair;

a reference potential conductor;

a source of pump signals having two pump signal supply terminals;

a pump signal propagation path in the form of two independent conductors, one connected to each of said pump signal supply terminals;

a plurality of pairs of pump signal transformation means, each said pair comprising a pair of transformation conductors connected at one end to the free terminals of a pair of said amplification elements, connected at an intermediate point to said pump conductors and coupled at the remaining end to said reference conductor, all of said transformation conductors having substantially the same overall electrical length between the amplification elements and the reference conductor but each succeeding pair of transformation conductors having a greater electrical length between the amplification elements and the pump conductors;

and means coupled to said pump signal propagation conductors for terminating said conductors;

said pump signal circuit being so constructed and arranged that in operation pump signals existing on said pump conductors are transformed to higher potential levels and supplied to said amplification elements, with each successive pair of transformation means providing a greater transformation ratio so as to compensate for loading of the pump signal propagation path so that pump signals of substantially constant potential level are applied to all amplification elements.

References Cited by the Examiner

UNITED STATES PATENTS

| | | | |
|---|---|---|---|
| 2,016,492 | 1/62 | Landauer | 330—4.6 |
| 3,076,149 | 1/63 | Knechtli et al. | 330—4.6 |
| 3,094,664 | 6/63 | Kibler | 330—4.6 |
| 3,096,485 | 7/63 | Chang | 330—4.6 |

GEORGE N. WESTBY, *Primary Examiner.*

ROY LAKE, *Examiner.*